Jan. 5, 1943.  J. DICHTER  2,307,114
MACHINE FOR SHAPING PLASTIC MATERIALS
Filed Sept. 9, 1940  3 Sheets-Sheet 2

Inventor
Jakob Dichter,
By Charles B. Belknap
Attorney

Jan. 5, 1943.    J. DICHTER    2,307,114
MACHINE FOR SHAPING PLASTIC MATERIALS
Filed Sept. 9, 1940    3 Sheets-Sheet 3
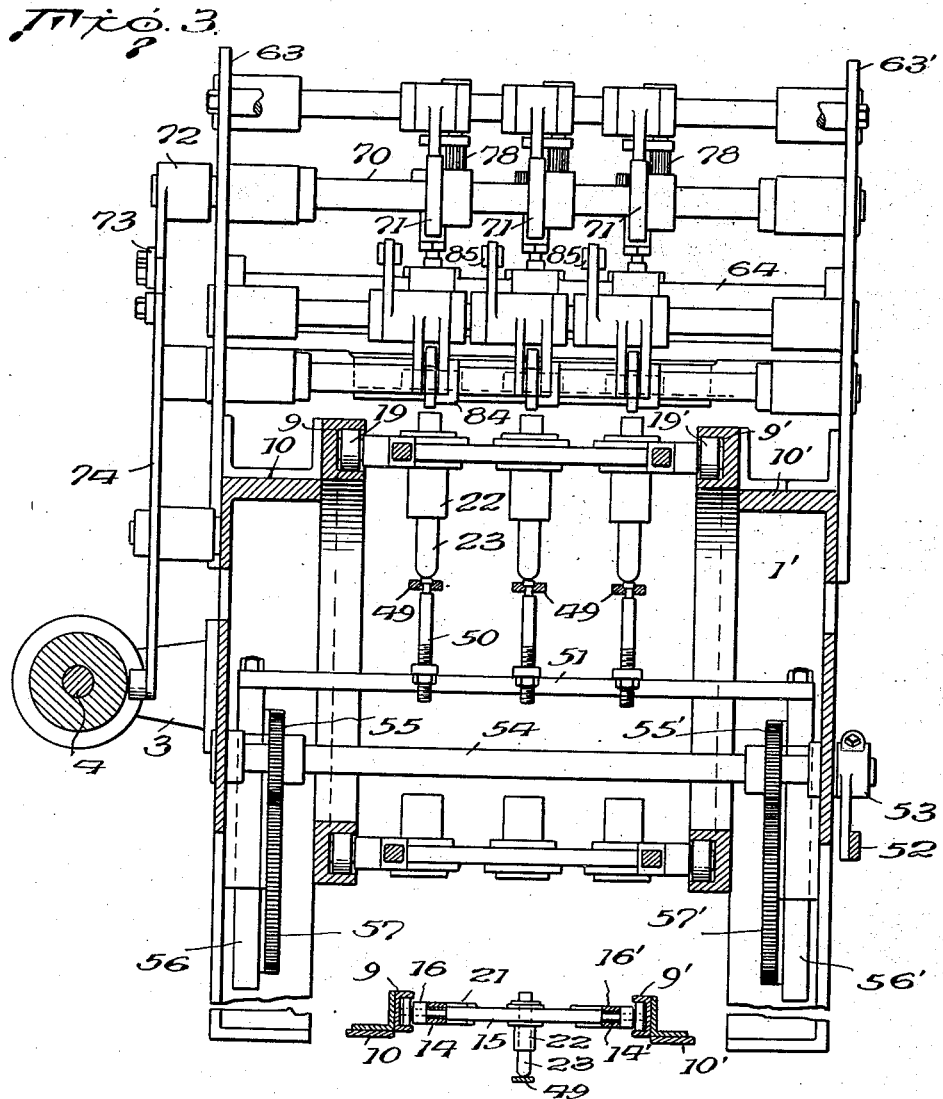
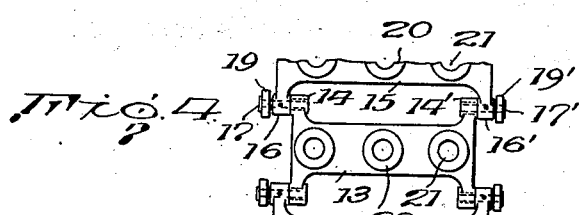
Inventor
Jakob Dichter,
By Charles B. Belknap
Attorney Patented Jan. 5, 1943

2,307,114

UNITED STATES PATENT OFFICE 2,307,114

MACHINE FOR SHAPING PLASTIC MATERIALS

Jakob Dichter, Berlin-Schoneberg, Germany

Application September 9, 1940, Serial No. 356,092
In Germany September 13, 1939

2 Claims. (Cl. 18—19)

The present invention pertains to the shaping of bodies formed from plastic materials such as cellulose acetate. More particularly the invention relates to the reshaping of hollow cylindrical bodies produced by dipping, drawing, or other well known methods. In certain types of plastic material containers, for instance, cylinders are formed by dipping a cylindrical mold in the plastic material which is then permitted to dry and assume the shape of the mold. Usually the mold has a semi-spherical end, the body formed thereon consequently having a rounded bottom. After the container is dried, it is cut to a suitable length and further shaped, if desired.

One of the objects of this invention is to provide an improved machine including conveying mechanism and shaping devices which automatically reshape preformed bodies of the character referred to.

Another object of the invention is the provision of novel mechanism for accurately presenting the bodies to shaping dies and the operation of said mechanism in timed relation to the actuation of the dies.

Other objects will be apparent from the following description of the machine in which reference is made to the drawings illustrating one embodiment of the invention. In the drawings:

Fig. 3 is a front view, partly in section, of the machine;

Fig. 4 is a fragmentary plan view of the transporting chain; and

Fig. 5 is an enlarged fragmentary section of a molding plug employed in the machine.

Figure 1:
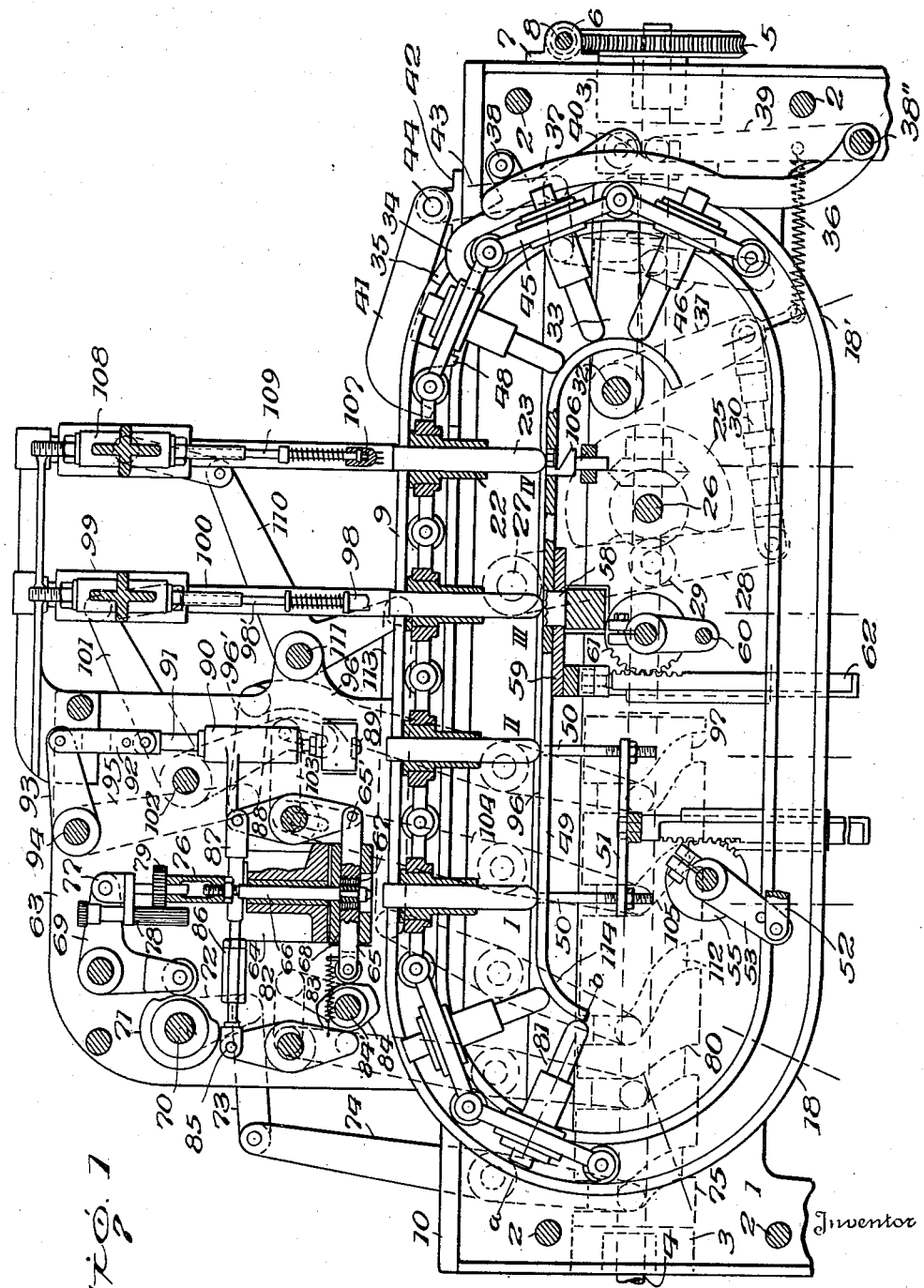
Fig. 1 is a sectional side elevation of the machine.

Referring to the drawings, it will be seen that the base of the machine comprises side frames 1, 1' connected by tie-rods 2, the side frames supporting bearings 3 in which cam shaft 4 is journaled. Keyed to shaft 4 is a worm gear 5, the latter being driven by worm 6 on shaft 8. Bearings 7, 7' accommodate shaft 8 which is rotated by a suitable motor (not shown).

The conveyor is adapted to be guided by the endless channel-shaped guide rails 9, 9' attached at opposite sides of the machine to members 10, 10' of the side frame. This conveyor comprises a plurality of supporting links 13 having bearings 14, 14' formed thereon and other similar links 15 provided with bearings 16, 16', the links being connected by pins 17, 17' passing through bearings 14, 14', 16, 16'. Rollers 19, 19' are rotatably mounted on pins 17, 17' and adapted to carry the chains over the guide rails 9, 9' and the curved portions 18, 18' thereof. It will be seen from Fig. 4 that each link of the conveyor chain is apertured at 21 to receive a container, the apertures being of sufficient diameter to accommodate the largest size container to be shaped. Suitable bushings 22 are provided to be inserted in openings 21 and adapted to accommodate containers of smaller diameter.

The containers, indicated at 23, are deposited at the forward end of the machine in the openings of the conveyor links either manually or by automatic means, the latter forming no part of this invention and therefore not being shown. Thereafter the conveyor is given a step-by-step movement by the following mechanism. Bevel gear 24 fast on shaft 4 meshes with bevel gear 24' secured to shaft 26, to the latter of which is keyed cam 25. Pivoted to the side frame at 27 is a lever 28 having a cam follower 29 thereon, the follower engaging cam 25. A connecting link 30 is pivotally connected at its ends to the free ends of lever 28 and arm 31 fast on shaft 32 to which are also secured arms 33, 33'. Pivotally connected to the ends of arms 33, 33' are pawl members 34, 34', having hooked ends which are adapted to engage rollers 19, 19' during their downward travel, to index the chain forwardly a limited distance, equal to the distance between the shaping stations of the machine. As will be seen in Fig. 2, the upper flanges of the channel-shaped guide rails 9, 9' are recessed at 35 to permit the pawls to engage the rollers. Lever 28 and arm 31 are normally urged toward the right in Fig. 1 by spring 36, thus maintaining engagement of follower 29 with cam 25. Positioned at opposite sides of the conveyor are arcuate arms 37, 37' keyed to shaft 38'' and acting as guides for rollers 38, 38' on pawls 34, 34'. Arm 39, also fast on shaft 38'', is oscillated by cam 40 on shaft 4. On the return upward of the pawls, arms 37, 37' are swung away from the conveyor, thus holding the pawls out of engagement with rollers 19, 19'.

To prevent overtravel of the chain and accurate positioning thereof with respect to the shaping devices, a stop arm 41 having a V-shaped projection 48 is secured to shaft 44 to which is also fastened arm 43, shaft 44 being rotatably mounted in bearing 42. Arm 41 is connected by means of link 45 to lever 46 pivoted to the frame and oscillated by cam 47 to rock into and out of engagement with roller 19 in timed relation to movement of the conveyor, i. e., projection 48 engages successive rollers at the end of each forward advance accurately to position the conveyor during the shaping operation.

Figure 2:
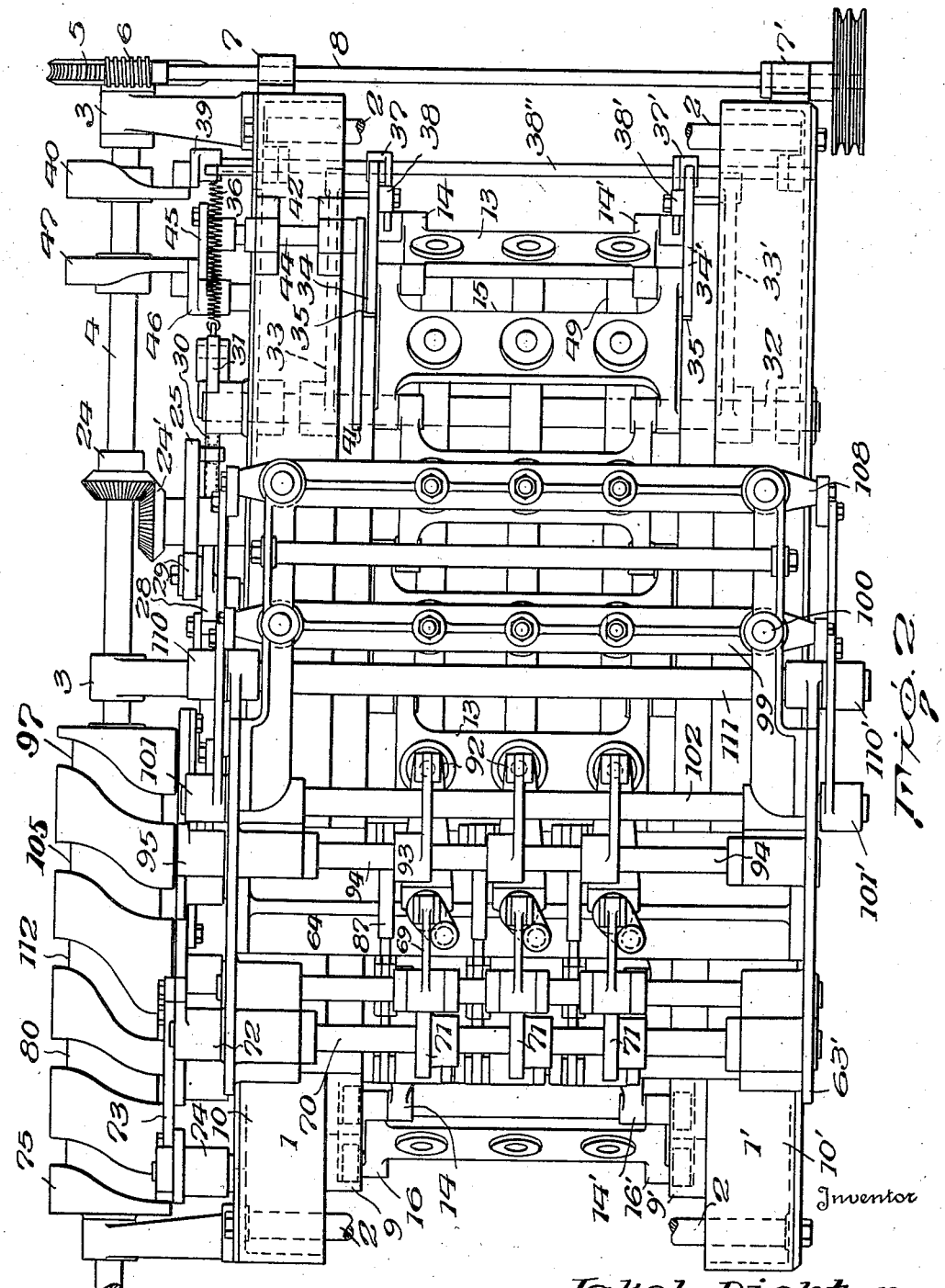
Fig. 2 is a top plan view of the machine shown in Fig. 1.

In Figs. 1 and 3 it will be seen that the bottoms of the containers 23 ride on rails 49 supported on frame 59 each of the rails being apertured at points corresponding to processing stations I, II, III and IV. At two of the stations push rods 50 are aligned with certain of these apertures and are adapted to be reciprocated to elevate the containers. Push rods 50 are adjustably fixed to plate 51 mounted on slides 56, 56' to which are secured racks 57, 57'. Connecting rod 52 is pivotally attached to crank 53 on shaft 54 to which are keyed gears 55, 55' meshing with the rack. Suitable cam means (not shown) reciprocates rod 52 which, through the mechanism just described, lowers and elevates plate 51 and push rods 50. In a similar manner shaping tool 58 is reciprocated by crank 60, gear 61, and racks 62.

On each side of the machine are plates or uprights 63 for supporting the shaping tools and their operating mechanisms. If it is desired to form threads on the open ends of the containers, the following apparatus is employed. Cross-member 64 carries on the under side thereof a guide plate 68 in which are slidably supported a pair of opposed threading dies 65, 65', each of which is heated and designed to thread half of the thread circumference. Plunger 66 guided in cross-member 64 carries at its lower end a slightly conical rubber sleeve 67, the upper end of which is somewhat larger than the bore guiding plunger 66 and adapted to abut guide plate 68 so that, when plunger 66 is elevated, the rubber ring will expand. The means for elevating plunger 66 consists of bell-crank 69 oscillated by cam 71 on shaft 70 to which is secured arm 72. The latter is connected to lever 74 by means of link 73. Cam 75 rocks lever 74 and, consequently, bell-crank 69. It will be seen that plunger 66 is connected to the bell-crank by a turnbuckle 76 adjustment whereof may be made by turning a toothed pin 78 meshing with a toothed portion 79 of the turnbuckle and supported in bracket 77, the latter forming part of the pivotal connection between bell-crank 69 and the turnbuckle.

The threading jaws are reciprocated in opposite directions by means of a cam 84 keyed to shaft 84' and actuated by cam 80 on shaft 4 through lever 81, link 82, and arm 83, also fixed to shaft 84'. Cam 84 acts directly on die 65 and indirectly on die 65' through levers 85, 88, connected by link 87, the length of which may be varied by adjustment of turnbuckle 86.

At station II there is shown a die indicated at 80 designed to form a reinforcing lip on the containers in the event a stopper rather than a screw-thread cap is employed as a closure for the container. The lip forming die, which is heated, is carried by a plunger 91 mounted for vertical reciprocation in bearing 90 and is connected by link 92 to arm 93 keyed to shaft 94. Also secured to shaft 94 is an arm 95 connected to lever 96 by link 86'. Lever 96 is adapted to be rocked by cam 97 on shaft 4, thus effecting reciprocation of the lip forming die 89.

If it is desired to form containers having flat bottoms instead of the rounded bottoms produced by the dipping molds, the container may be reshaped at station III by the bottoming die indicated at 58 and head 98 on reciprocable plunger 98'. Cross-piece 99 is slidably mounted for vertical reciprocation on uprights 100 and carries a plurality of plungers 98'. Reciprocation of the cross-piece is effected by bell-cranks 101, 101' on shaft 102 connected to lever 104 by link 103. Lever 104 is rocked by cam 105 on shaft 4.

When the container is to be perforated to provide ventilation, the mechanism illustrated at station IV is employed. Die 106 is apertured to correspond with punches 107 on plunger 109, of which there is a plurality. These plungers are carried by cross piece 108 which is vertically reciprocated by the mechanism consisting of bell-cranks 110, 110' on shaft 111, link 113, lever 114 and cam 112 on shaft 4.

Provisions are made to use only one or more of the several shaping tools, the connecting links between the main cams on the tools being readily removable. The stations are spaced a distance equal to the length of the links and the advancing or indexing mechanism is so designed that the conveyor is indexed a distance equal to that between stations. All of the cams for advancing and elevating the work, reciprocating the tools and providing for alternate operation of the conveyor and tools are so timed that the mechanisms operate in accurate sequence.

While the drawings illustrate a preferred form of the invention, it is to be understood that the machine may be modified and is to be limited only by the terms of the following claims.

Having described my invention what I claim as new and desire to secure by Letters Patent is:

1. Apparatus for threading an open end of a body of plastic material comprising a heated threaded die, means for effecting relative movement between said die and the body to bring the die into engaging relation with the body, a plunger, elastic means on said plunger insertable in the open end of the body, a guide for said plunger, and means for moving said elastic means into engagement with said guide to expand said elastic means to force the body into said die.

2. Apparatus for threading an open end of a body of plastic material comprising a heated threaded die, means for effecting relative movement between said die and the body to bring the die into engaging relation with the body, a plunger, a conical rubber member on said plunger insertable in the open end of the body, a guide for said plunger, and means for moving said member into engagement with said guide to expand said elastic means to force the body into said die.

JAKOB DICHTER.